Patented Aug. 31, 1954

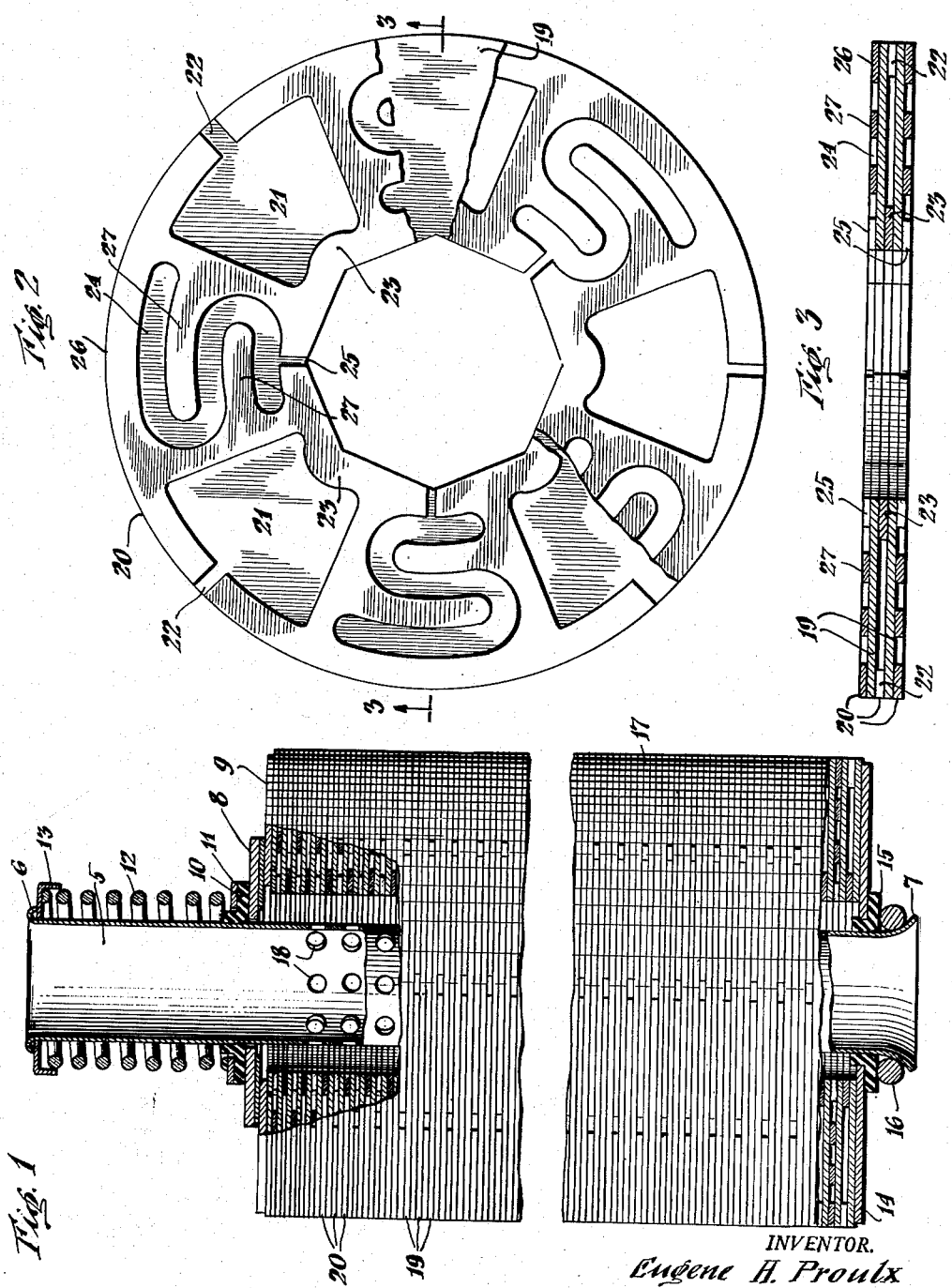

2,687,805

UNITED STATES PATENT OFFICE 2,687,805

FILTER STRUCTURE

Eugene H. Proulx, Elmira, N. Y., assignor to The Hilliard Corporation, Elmira, N. Y., a corporation of New York Application January 7, 1950, Serial No. 137,399

4 Claims. (Cl. 210—169)

This invention relates to an improved filter structure especially intended in the filtering of oil used in lubricating and other systems.

It is an object of the invention to furnish a unit of this type through which a high rate of flow may be maintained without resorting to the use of high pressures and without sacrificing in any way the thoroughness of the filtering action.

A further object is that of furnishing a device of this type which will have a relatively long life with freedom from clogging of any of its parts, such filter being capable of ready and economical renewal when replacement is necessary.

Still another object is that of furnishing a filter structure by means of which foreign material in a body of oil or other liquid will be separated from such liquids and retained within the structure of the filter, so that a sufficiently purified oil flows from the filter and which oil will possess high lubricating qualities free from destructive abrasion characteristics.

With these and other objects in mind, reference is had to the attached sheet of drawings illustrating one practical embodiment and in which:

Fig. 1 is a partly fragmentary sectional side view of a complete filter structure such as is disposable in a proper casing;

Fig. 2 is a face view of a portion of the filter pack with certain of the parts of the upper element broken away to disclose an adjacent lower element and with the latter in turn broken away to show underlying construction; and Fig. 3 is a transverse sectional view taken along the lines 3—3 and in the direction of the arrows as indicated in Fig. 2.

Referring primarily to Fig. 1, the numeral 5 indicates a tube preferably of metal which may conveniently have one end turned outwardly as indicated at 6, its opposite end being flared as indicated at 7. A ring 8, also conveniently of metal, may thrust against a plate 9 and a gasket may be interposed between elements. A further gasket 10 is conveniently disposed beyond ring 8 and extends through an opening in ring 11. The latter may have one end of a spring 12 bearing against it, the opposite end of that spring bearing against a cap or retaining member 13 resting against the out-turned end portion 6 of the tube.

Adjacent the opposite end of that tube a plate 14 of metal or other suitable material is preferably disposed. This plate is formed with a central opening through which a gasket 15 may extend. Both gaskets 10 and 15 are conveniently formed of synthetic material. A retaining ring 16 may bear against the face of gasket 15 and the flared surface 7 of tube 5. Between plates 9 and 14 a filter pack or assembly is disposed. As will be understood, the foregoing structure is merely illustrative of one form of assembly. Obviously other forms may be employed. In any event, it is preferred to employ a spring or other suitable structure to maintain the filter pack in proper position. Also a structure similar to the gaskets 10 and 15 should be employed in order to furnish a substantially leak-proof assembly.

Regardless of the details of this assembly, it will be understood if it includes a tube such as 5 formed with perforations 18 within the zone of the pack 17, that in accordance with conventional construction it may be disposed within a filter casing. That casing has connections such that the dirty oil flows to its interior and around the filter pack. In its passage through the latter, the oil is purified. Thereafter the filtered oil flows through perforations 18 into a discharge passage forming a part of the casing. Heaters and various other auxiliary structures may or may not be used in accordance with commonly accepted practices in this art. The present invention has primarily to do with the detailed structure of the pack 17 which includes superposed disks of suitable material embodying filtering characteristics. The structure of the disks (which may be circular or embody any other desired and suitable configuration) has been shown in detail in Figs. 2 and 3.

In those views the numeral 19 indicates circular shaped disks presenting substantially solid bodies. The numeral 20 indicates disks which are interposed between the disks 19. As shown, it is preferred that an imperforate or solid disk be employed and that to each side of the latter disks such as 20 be disposed. In turn beyond these, disks such as 19 are arranged and this sequence is continued until a stack of sufficient height is provided. As will be apparent, two or more of one type of disk might be disposed adjacent each other in the form of groups between which one, two, or more disks of the second type might be arranged. The employment of two or more disks of similar types adjacent each other would usually be resorted to where the stock of which the disks are formed is relatively thin and where accordingly it is desirable that layers be superposed to furnish in effect single units of adequate thickness. However, with stock of proper gauge, it is ordinarily preferred that the arrangement of parts be as afore described and herein illustrated.

Referring especially to Fig. 2 and particularly the disk as designated by the numeral 20, it will be seen that this includes a centrally perforated body embodying an annular series of structures to furnish a similar series of compartments when imperforate disks are disposed above and below the disk 20.

The material of disk 20 is omitted at spaced points indicated at 21. In line with these zones, slits or openings 22 interrupt the outer edge of the disk. The opposite, or inner edge of the zone is defined by a solid portion 23. Between zones or openings 21 the disk has portions of its body removed as at 24 to furnish a tortuous channel continued through the inner edge of the disk by a slit or opening 25. The outer edge of the disk in line with the zone is solid as indicated at 26. The channels 24 are conveniently of S shape. Their width may be around 1/4". Due to the formation of the channels relatively projecting portions 27 are furnished throughout these zones.

As afore brought out, disks 19 and 20 alternate in the stack. Additionally and as shown, the zones defined by openings 21 of a disk 20 are disposed in registry with the zones defining the channels 24 in an adjacent disk 20. In other words, if these disks include a series of zones corresponding in number to those illustrated, then adjacent disks 20 are axially rotated with respect to each other so that they are displaced to the extent of 45°. Between the different disks 20 disks 19 are disposed.

Therefore, with a stack provided as in Fig. 1, and the assembly disposed in a filter casing through which oil is circulated, the dirty or contaminated oil will flow inwardly through slots or passages 22 into the compartments defined by openings 21 and the adjacent imperforate disks 19. There being no outlet to these compartments, and under the action of continuing pressure, the oil will pass upwardly and downwardly through the bodies of the adjacent disks 19 and in such passage will be filtered. As it emerges from the opposite faces of these adjacent disks 19 it will pass into zones or compartments defined by the passages 24. Flowing through the latter it will pass through outlets 25 and thence, for example, through the openings 18 of tube 5 to the clean oil outlet of the apparatus. In its flow into the compartments defined by openings 21 there will be a substantial diminution in velocity of movement. Consequently sedimentation will be deposited within these compartments. The area of the compartments is sufficiently large so that a relatively great reserve capacity is furnished such that the filter will not become clogged even if the foreign material and consequent sedimentation is quite heavy.

As the filtered fluid flows into passages 24 some foreign materials may also remain within them. Due to the fact that the width of the passages 24 is relatively restricted, the projecting portions 27 will support the adjacent faces of disks 19. Therefore the latter will not collapse even though they may be subjected to inward pressure of substantial value. As will be understood, when the sedimentation occurs beyond a certain point (as may be the case after the filter has been used for a relatively long period of time with heavily contaminated oil), portions of the filter surfaces and passages may become clogged. The filter will, however, continue to function because under these circumstances a greater or lesser amount of the contaminated oil may flow through the solid portions of disks 20 and to some extent through the disks 19 as it moves towards the central zone of the assembly.

Contrary to the structures shown, for example, in prior United States patent to Colas 2,190,014 of February 13, 1940, and Hicks 2,455,436 of December 7, 1948, a relatively high flow may be continuously maintained without the employment of a high pressure drop or the danger of a collapse of parts or all of the structure. Due to the fall-off in velocity of flow as the contaminated oil enters the zones or compartments defined by the openings 21, sedimentation will deposit upon the surfaces of these compartments at a high rate. It has been found that a filter of this type employed in comparative tests with a filter utilizing cotton waste, disks, etc., that a volumetric flow many times that of the older type filter may be maintained with no drop-off in the quality of filtration. This is despite the fact that the pressure differential or drop is maintained at 10 pounds or less. As long as any flow occurs through the present filter, a satisfactory filtering action will occur. Back pressures will not develop prematurely such that the safety valves will unseat with consequent by-passing and non-filtering of contaminated oil.

Thus, among others, the several objects of the invention as specifically aforenoted are achieved. Obviously numerous changes in construction and rearrangement of the parts might be resorted to without departing from the spirit of the invention as defined by the claims.

I claim:

1. In a filter structure a layer of material formed with a central opening, said layer being formed with an annular series of compartments disposed around said opening, edge portions integral with said material layer and defining the outer and inner ends of said compartments, projecting portions forming a part of said layer and disposed so that certain of said compartments are of a generally S-shaped configuration and extend radially of said layer, said edge portions being interrupted to provide passages of restricted areas, certain of said passages extending in direct communication with said central opening and others communicating with the space beyond the outer compartment ends.

2. In a filter structure a layer of material formed with a central opening, said layer being formed with an annular series of compartments disposed around said opening, edge portions integral with said material layer and defining the outer and inner ends of said compartments, projecting portions forming a part of said layer and disposed so that certain of said compartments are of a generally S-shaped configuration and extend radially of said layer, said edge portions being interrupted to provide passages of restricted areas, certain of said passages extending in direct communication with said central opening and the inner ends of said S-shaped compartments and other passages communicating with the space beyond the outer compartment ends.

3. In a filter structure a layer of material formed with a central opening, said layer being formed with an annular series of compartments disposed around said opening, edge portions integral with said material layer and defining the outer and inner ends of said compartments, projecting portions forming a part of said layer and disposed so that certain of said compartments are of a generally S-shaped configuration and extend radially of said layer, said edge portions being interrupted to provide passages of restricted areas, certain of said passages extending in direct communication with said central opening, others communicating with the space beyond the outer compartment ends a centrally perforated second layer of material presenting a substantially solid body disposed to overlie said first named layer, a third layer overlying said second layer, said third layer corresponding in configuration to the first layer and the third layer having its compartments axially displaced with respect to the compartments of the first layer whereby the S-shaped compartments to said first and third layers are not aligned.

4. A filter disk for a filter stack made of fibrous sheet filtering material, said disk having a central aperture and a plurality of pairs of cut-out openings disposed symmetrically around said central aperture, said openings being of substantially equal annular width circumferentially of the disk and spaced apart circumferentially of the disk a substantially greater distance than their circumferential width by filtering material and further openings having physical characteristics different than those of said first-named openings, and the openings of a pair each communicating with the periphery of the disk—while said further openings communicate with the central aperture of the disk—through restricted passageways of substantially less circumferential width than a minimum width of said openings.

References Cited in the file of this patent

UNITED STATES PATENTS

| Number | Name | Date |
|---|---|---|
| 2,359,475 | Gauthier | Oct. 3, 1944 |
| 2,436,108 | Heftler | Feb. 17, 1948 |
| 2,495,095 | Eubank | Jan. 17, 1950 |
| 2,501,582 | Rohland | Mar. 21, 1950 |
| 2,522,502 | Clark | Sept. 19, 1950 |
| 2,548,584 | Briggs | Apr. 10, 1951 |
| 2,553,820 | Gunn | May 22, 1951 |
| 2,604,994 | Vocelka | July 29, 1952 |